United States Patent
Khalid et al.

(10) Patent No.: US 7,107,587 B1
(45) Date of Patent: Sep. 12, 2006

(54) ACCESS REDIRECTOR AND ENTRY REFLECTOR

(75) Inventors: ATM Shafiqul Khalid, Bellevue, WA (US); Barry Bond, Maple Valley, WA (US)

(73) Assignee: Microsoft Corporation, Redmond, WA (US)

( * ) Notice: Subject to any disclaimer, the term of this patent is extended or adjusted under 35 U.S.C. 154(b) by 1123 days.

(21) Appl. No.: 09/665,214

(22) Filed: Sep. 18, 2000

(51) Int. Cl.
*G06F 9/45* (2006.01)
(52) U.S. Cl. .................. 717/167; 717/159; 710/260
(58) Field of Classification Search ............. 717/127, 717/155, 167, 159; 710/260, 8
See application file for complete search history.

(56) References Cited

U.S. PATENT DOCUMENTS

| | | | | |
|---|---|---|---|---|
| 5,313,616 A * | 5/1994 | Cline et al. | ............ | 717/127 |
| 5,428,799 A * | 6/1995 | Woods et al. | ............ | 710/266 |
| 5,600,823 A * | 2/1997 | Sherer et al. | ............ | 703/20 |
| 5,655,148 A * | 8/1997 | Richman et al. | ............ | 710/8 |
| 5,673,403 A * | 9/1997 | Brown et al. | ............ | 345/744 |
| 5,805,894 A * | 9/1998 | Robison | ............ | 717/155 |
| 6,003,097 A * | 12/1999 | Richman et al. | ............ | 710/8 |
| 6,105,101 A * | 8/2000 | Hester et al. | ............ | 710/260 |
| 6,115,741 A * | 9/2000 | Domenikos et al. | ............ | 709/217 |
| 6,185,734 B1 * | 2/2001 | Saboff et al. | ............ | 717/164 |
| 6,279,109 B1 * | 8/2001 | Brundridge | ............ | 713/2 |
| 6,366,988 B1 * | 4/2002 | Skiba et al. | ............ | 711/165 |

* cited by examiner

*Primary Examiner*—John Chavis
(74) *Attorney, Agent, or Firm*—Lee & Hayes, PLLC (57) ABSTRACT

When using a common configuration data structure (e.g., "registry"), the access redirector and entry reflector promotes compatibility and interoperability between differing versions of program modules. The access redirector redirects selected accesses to storage locations (i.e., "nodes") of a common configuration data structure. The selected accesses are redirected to another node. This redirection stores configuration information for differing versions of program modules at different nodes. However, the differing versions are unaware that they are accessing different nodes. As configuration information in a node is changed, the entry reflector may copy selected portions of such changed information into its associated "reflected" node and vice versa. This reflection allows associated "reflected" nodes to share relevant configuration information that promotes interoperability.

40 Claims, 5 Drawing Sheets

ACCESS REDIRECTOR AND ENTRY REFLECTOR

TECHNICAL FIELD

This invention relates to interoperability and compatibility of differing versions of program modules using a common configuration data structure.

BACKGROUND

For each version of an operating system (OS), there are corresponding versions of applications. For example, a 16-bit application is designed to run on a 16-bit OS (such as Microsoft® Windows 3.1®). An example of another version is a 32-bit application, which is designed to run on a 32-bit OS (such as Microsoft®Windows® 98).

Specific versions of applications are designed to operate under a specific version of a specific OS. Furthermore, that specific version of a specific OS is designed to operate with specific computing hardware (such as a specific microprocessor).

For example, Microsoft® Office 2000 is an application designed to operate on 32-bit versions of operating systems from the Microsoft Corporation. Examples of such 32-bit operating systems include Windows® 2000, Windows NT® 4.0 (and earlier), Windows® 98, and Windows® 95. The 32-bit OSs are designed to operate on 32-bit compatible processors using an 32-bit instruction set (such as the Intel™ Pentium™, Pentium II™, and Pentium III™).

"Version"

Herein, a reference to a "version" of a program module (such as an application) refers to a class of module that is designed to run under a level of operating system that is different than a previous version of the same program module. A new release of a program model is considered a new "version" when it is more than an incremental improvement and change.

For example, Microsoft® Word 95 is a version of the application that is different from Microsoft® Word 6.0. This is because Microsoft® Word 95 is designed to run on 32-bit OSs (such as Microsoft® Windows® 95 or later version), but it cannot run on 16-bit OSs (such as Microsoft® Windows® 3.1). Conversely, Microsoft® Word 97 is not a different version from Microsoft® Word 95 because both are designed to work on 32-bit OSs like Microsoft® Windows® 95.

A program module may be considered a different version if it uses a different fundamental basis than its previous incarnation. For example, program modules use submodules such as a Dynamic Link Library (DLL) or Application Program Interfaces (APIs). A new program module is a new version if it utilizes a different family of DLLs and APIs than what the previous implementation of such module used.

This same versioning terminology applies to any program module, such as an application, operating system, etc.

Interoperability and Compatibility

Each version of an OS has its corresponding body of applications that are designed to run under it. When a new version of an OS is released, software developers generally upgrade their products to a new version designed to run under the new OS. Software developers do this for many reasons, including marketing, technology, and economics.

For similar reasons, OS developers wish to make their products backwards compatible. In this way, older versions of applications will run on the latest version of the OS. This encourages users to purchase the new OS because they are not forced to discard their current applications and purchase new versions. This also gives software developers time to provide upgrades to their applications.

Configuration

Configuration is the way a system is set up, or the assortment of components that make up the system. Configuration can refer to either hardware or software, or the combination of both. For instance, a typical configuration for a PC consists of 32 MB (megabytes) main memory, a floppy drive, a hard disk, a modem, a CD-ROM drive, a VGA monitor, and an operating system.

Many software products require that the computer have a certain minimum configuration. For example, the software might require a graphics display monitor and a video adapter, a particular microprocessor, and a minimum amount of main memory.

When a person installs a new device or program, she sometimes needs to configure it, which means to set various switches and jumpers (for hardware) and to define values of parameters (for software). For example, the device or program may need to know what type of video adapter you have and what type of printer is connected to the computer. Thanks to new technologies, such as Plug-and-Play, much of this configuration is performed automatically.

Configuration Databases

Software applications typically employ one or more configuration databases to store configuration settings. Under some OSs (such as Windows® 3.1 and MS-DOS®), multiple configuration databases were used by the OS and the applications. There were files for starting the system (e.g., CONFIG.SYS and AUTOEXEC.BAT). There were files for connecting to a network (e.g., NETWORK.INI). There were files for running applications (e.g., WIN.INI and SYSTEM.INI).

Each configuration file had its own rules and structure. Maintaining these files was a difficult chore for the OS. Providing a limited degree of synchronization between these files was also a difficult chore for the OS.

Common Configuration Data Structure

With the advent of more advanced OSs (such as Windows NT® and Windows® 95), a common configuration data structure was introduced. It is called the "Registry." All configuration settings are stored therein (except for other legacy configuration files that remained for backward compatibility reasons).

Herein, a common configuration data structure refers to a set of multiple configuration databases used by more than one version of a program module (such as an application). In addition, a common configuration data structure refers to a single configuration database (such as the Registry) used by more than one version of a program module (such as an application). A configuration database is often stored as one or more configuration files on the storage system of a computer.

The Registry. Certain OSs store and check the configuration information (herein, "config-info") at a single location—called the registry. Most applications write data to the registry, at least during installation. The registry is an example of a common configuration data structure.

The registry is a hierarchically structured database containing subtrees of keys that contain per-computer and per-user databases. Each key may contain data items called value entries and may contain subkeys. In the registry structure, keys (and subkeys) are analogous to directories and value entries are analogous to files.

The registry may include the following major sections (i.e., subtrees):

- HKEY_Classes_Root—file associations and OLE information
- HKEY_Current_User—all preferences set for current user
- HKEY_User—all the current user information for each user of the system
- HKEY_Local_Machine—settings for hardware, operating system, and installed applications
- HKEY_Current_Configuration—settings for the display and printers
- HKEY_Dy_Data—performance data Compatibility Problem Herein, compatibility refers to different versions of the same program module peacefully co-existing on the same system. A new version of a program module is said to be backward compatible if it can use files and data created with an older version of the same program.

Often different versions of an application store their config-info in a common configuration data structure. In fact, different versions of an application typically store their config-info at the exact same location within a common configuration data structure.

A later installed version may overwrite existing config-info for an earlier installed version. As a result, the earlier version is unlikely to run correctly (or at all) because its config-info has been changed. Sometimes residual config-info exists in the common configuration data structure and it may interfere with the smooth performance of the later installed version.

By way of example, APIs and DLLs are an area where changes in config-info can greatly affect the performance and/or the operation of different versions of an application using a common configuration data structure. If the later version refers to a family of APIs and/or DLLs that are incompatible with the earlier version, then the earlier version is likely to cause operation failure and/or performance problems. This happens because the earlier version is incapable of using APIs and DLLs designed for use by a later version.

Interoperability Problem

As used herein, interoperability is the ability of program modules to share data. In particular, interoperability is the ability of differing "types" of program modules to share data. Program modules are different types when they are not just different versions of each other.

An example of interoperability is a Microsoft® Paintbrush application sharing data (such as a bitmap image) with a Microsoft® Office application. Regardless of version, Microsoft® Paintbrush and Microsoft® Office are different types of program modules.

It is desirable for an OS to provide this type of interoperability between different types of program modules. However, such interoperability is difficult when the program modules are different versions.

An example of such a situation is when a 16-bit version of a Microsoft® Paintbrush application wishes to share data (such as a bitmap image) with a 32-bit version of Microsoft® Office application. Not only are these program different types, but also they are different versions.

Conventional Solution

The compatibly and interoperability problems like those described above occurred when Microsoft Corporation introduced its 32-bit OS in Windows® 95. To avoid these types of compatibility problems, the new 32-bit applications were instructed to store their config-info in a different location than the older 16-bit applications. In addition, they were directed to use different names for their APIs and DLLs.

Although this did help with compatibility and interoperability, it forced software developers to redirect large resources to software conversion rather than to development of new or improved software. Because of these directions, existing 16-bit versions of software needed to be significantly modified to port it to a 32-bit version. The code needed to be altered so that it referred to different APIs and DLLs. The code needed to be altered to store config-info to a different location and access it from that new location.

SUMMARY

When using a common configuration data structure (e.g., "registry"), the access redirector and entry reflector promotes compatibility and interoperability between differing versions of program modules.

The registry access redirector redirects selected accesses to storage locations (i.e., "loci", "nodes") of a common configuration data structure. The selected accesses are redirected to another node. This redirection stores configuration information for differing versions of program modules at different nodes. However, the differing versions believe that they are accessing the same node.

As configuration information in a node is changed, the registry entry reflector may copy selected portions of such changed information into its associated "reflected" node and vice versa. This reflection allows associated "reflected" nodes to share relevant configuration information that promotes interoperability.

DETAILED DESCRIPTION

The following description sets forth a specific embodiment of an access redirector and entry reflector that incorporates elements recited in the appended claims. This embodiment is described with specificity in order to meet statutory requirements, such as the written description, enablement, and best-mode requirements. However, the description itself is not intended to limit the scope of this patent. Rather, the inventors have contemplated that the claimed invention might also be embodied in other ways, in conjunction with other present or future technologies.

Introduction

Described herein is an operating system (OS) that implements the exemplary access redirector and entry reflector ("exemplary redirector/reflector"). This version of the OS is designed to accommodate versions of applications designed for the specified version of the OS and versions of applications designed for a previous version of the OS.

More specifically, described herein is a version of a 64-bit version of an OS ("64-bit OS") that implements the exemplary access redirector and entry reflector ("exemplary redirector/reflector"). This 64-bit OS is designed to accommodate 64-bit versions of applications (64-bit apps) designed for the 64-bit OS and 32-bit versions of applications (32-bit apps) designed for a 32-bit version of an OS ("32-bit OS").

Those who are skilled in the art understand and appreciate that the present invention claimed herein may be implemented in situations other than the specific examples described herein.

Registry

A "registry" is part of the 64-bit OS, described herein, that implements exemplary redirector/reflector. This "registry" is a common configuration data structure. More particularly, this registry is a common configuration database. In the 64-bit OS described herein, the registry is described in a hierarchical structure. Those who are skilled in the art understand and appreciate that a common configuration data structure (such as the registry described herein) may be organized in any fashion where elements are addressable for storing and accessing.

Figure 1:
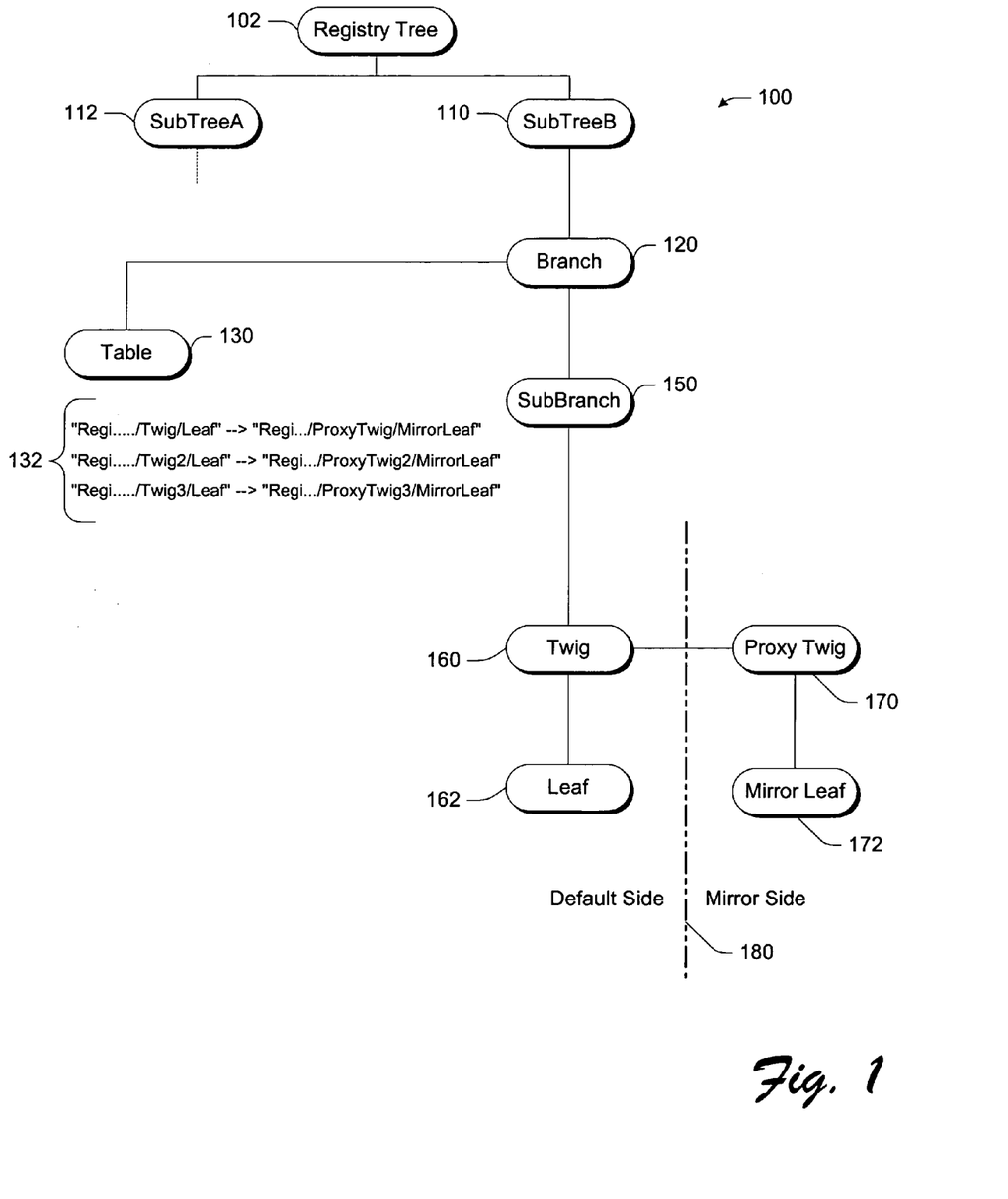
FIG. 1 illustrates a portion of a typical hierarchical structure of a common configuration data structure that may be a subject of an implementation of anaccess redirector and entry reflector.

FIG. 1 illustrates a portion of the hierarchical structure of the exemplary registry at 100. The top of the registry is root 102 called "registry tree." Below that are several subtrees. The head of two of such subtrees are shown in FIG. 1: "SubTreeA" 112 and "SubTreeB" 110. None of the nodes of SubTreeA are shown in FIG. 1. However, some of the nodes of SubTreeB are shown in this illustration.

"Branch" 120 and "SubBranch" 150 are examples of successively deeper nodes in the SubTreeB 110. Under Branch 120 is "Table" node 130. Under node 130 is a table 132. In the table is a list of addresses (which are discussed below) used for the implementation of the exemplary redirector/reflector. These are addresses to nodes or loci in the registry. Thus, the table 132 may be called a "loci-redirection" or "node-remapping" table.

Under SubBranch 150 are multiple nodes, such as "Twig" 160 shown in FIG. 1. Under Twig 160 are one or more leafs, such as "Leaf" 162. Twig 160 and its leaf 162 are on the "default side" of line 180. On the other side of the line are "Proxy Twig" 170 and "Mirror Leaf" 172. This other side of line 180 is called the "mirror" side.

Each node in the exemplary registry is addressable using this generic notation:

"RegistryTree/SubTreeX/Branch/SubBranch/Twig/Leaf"

This example refers to the Leaf 162 node. Of course, any addressing scheme may be used. This one is used to facilitate description of the exemplary redirector/reflector.

Redirector

The exemplary redirector/reflector includes a "redirector" portion. The exemplary redirector promotes compatibility. The exemplary redirector intercepts registry accesses and forwards them to a new location within the registry. The effect of such redirection is that registry reads and writes may be at a different location within the registry than what read and write commands specified.

In other words, the exemplary redirector will sit and wait for an application to access the registry. When it does, the application provides an address of a node where it is attempting to write or read. The access is intercepted. The type of access may be examined. Also, the application attempting to access is examined.

Based upon such examination and based upon a table of remapped addresses, the exemplary redirector may redirect such access to another node. Otherwise, the exemplary redirector may allow such access to the specified node. In either situation, the application believes that it is accessing the specified node.

The remapped nodes are for differing versions of application. For example, the default node may be for a 64-bit application on a 64-bit OS and the remapped node may be a 32-bit version of the same application.

Problems are inevitable when multiple independent entities write to and read from the same storage location in a database and when those independent entities believe that they have sole control over the information stored there. Here, each version of the same application believes that it has exclusive control over information stored at the same particular node in the registry. Therefore, there is a strong possibility that information added, modified, and/or removed by one application will significantly affect the other. The solution provided by the exemplary redirector is to redirect access to a unique location for each version of an application.

Redirector Methodology Implementation

Figure 2:
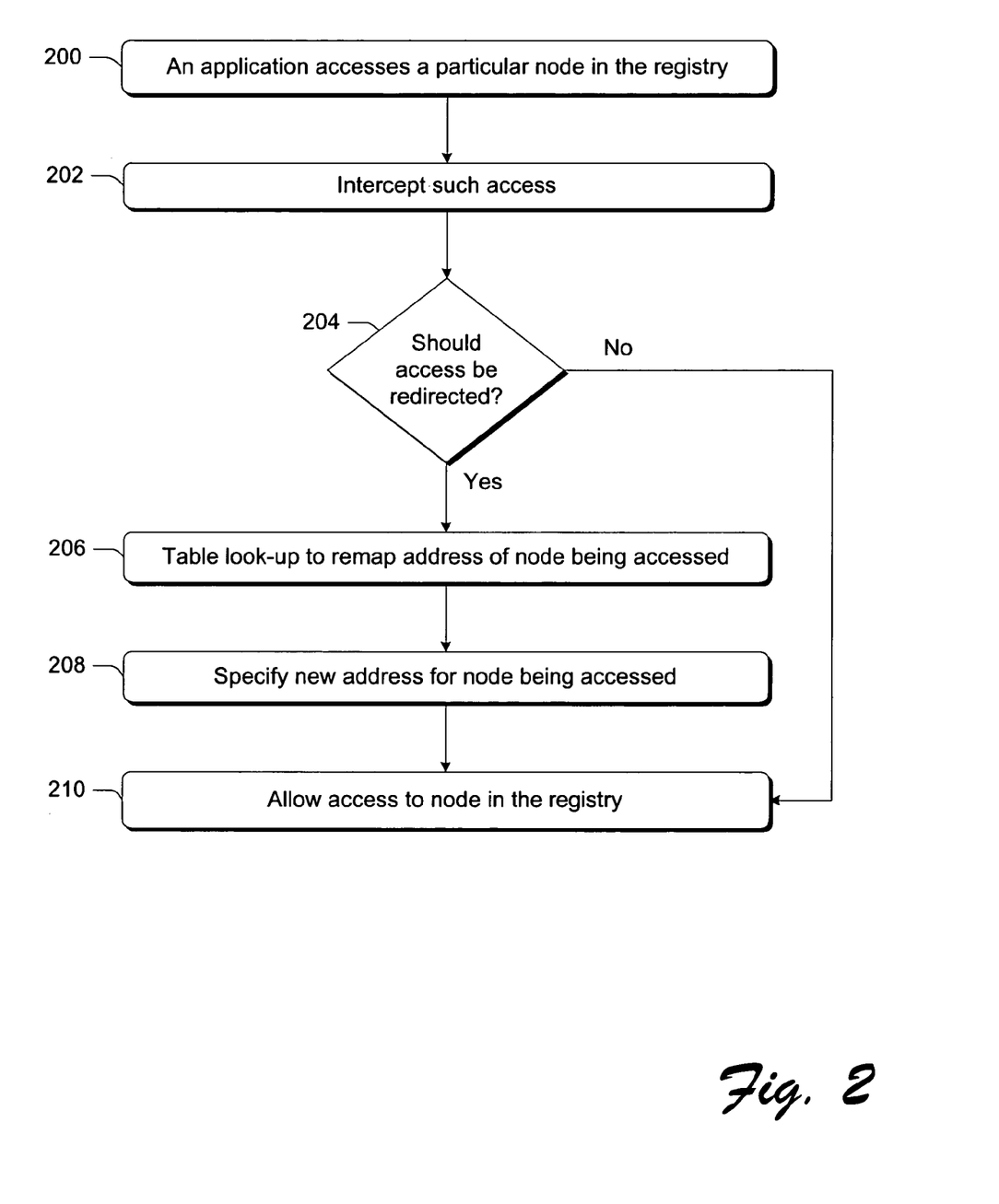
FIG. 2 is a flowchart illustrating the methodology of an implementation of an access redirector portion of an access redirector and entry reflector.

FIG. 2 shows a methodological implementation of the exemplary redirector. At 200, an application attempts to access a particular node in the registry. Access typically includes reading and/or writing.

Assume for descriptive purposes that the application uses this particular requested node to store config-info about itself. This node may specify associated DLLs and APIs. It may specify initialization and customization options.

At 202, the exemplary redirector intercepts such access and examines it. It may examine any aspect of the access: the type of access, the timing of such access, the parameters, etc. It may also examine the application requesting such access. At 204, based upon such examination, the exemplary redirector will determine whether such access should be redirected. If no redirection is necessary, then the process jumps to block 210 where access is allowed to the requested node. Otherwise, the process proceeds to block 206.

At 206, the exemplary redirector examines a look-up table of remapped addresses. If the address of requested node is not found in the table, then the original address of the node is specified at 208. If the address of requested node is found in the table, then its associated remapped address is specified at 208. At 210, this specified address is used to write to the registry or to read from the registry.

Example using exemplary redirector methodological implementation of FIG. 2. The explanation of this example refers to FIGS. 1 and 2. The registry is a common configuration data structure for a 64-bit OS and applications running thereunder. At 200 in FIG. 2, a 32-bit version application attempts to access a particular node in the registry. The particular node in this example is "RegistryTree/SubTreeX/Branch/SubBranch/Twig/Leaf" (i.e., node 162 in FIG. 1).

Assume for descriptive purposes that the 32-bit application uses this particular requested node 162 to store config-info about itself. Also, assume that a 64-bit version of the same application uses this same node 162 to store config-info about itself.

At 202, the exemplary redirector intercepts the 32-bit application's access to "RegistryTree/ . . . /Twig/Leaf" and examines it. It determines the version of the application requesting such access. At 204, since a 32-bit application is requesting such access, it determines that it should be redirected. Thus, the process proceeds to block 206.

At 206, the exemplary redirector examines the look-up table (132 of FIG. 1) of remapped addresses. It finds "RegistryTree/ . . . /Twig/Leaf" in the table 132 and knows that such address should be redirected to its associated remapped address in the table: "RegistryTree/ . . . /Proxy-Twig/MirrorLeaf." At 208, the remapped address is specified. At 210, this specified address is used to write to the registry or to read from the registry at "Registry-Tree/ . . . /ProxyTwig/MirrorLeaf" rather than the originally requested address. The remapped node is Mirror Node 172.

Thus, each time that the 32-bit application reads or writes anything to "RegistryTree/ . . . /Twig/Leaf" node, it instead reads or writes to "RegistryTree/ . . . /ProxyTwig/Mirror-Leaf" node.

Reflector

The exemplary redirector/reflector includes a "reflector" portion. The exemplary reflector promotes interoperability.

As needed, the exemplary reflector examines mirrored nodes. Differences are noted. Those differences in one node that promote interoperability are copied to the other node. Thus, some modifications of a node are "reflected" in its associated mirror node and vice versa.

Reflector Methodology Implementation

Figure 3:
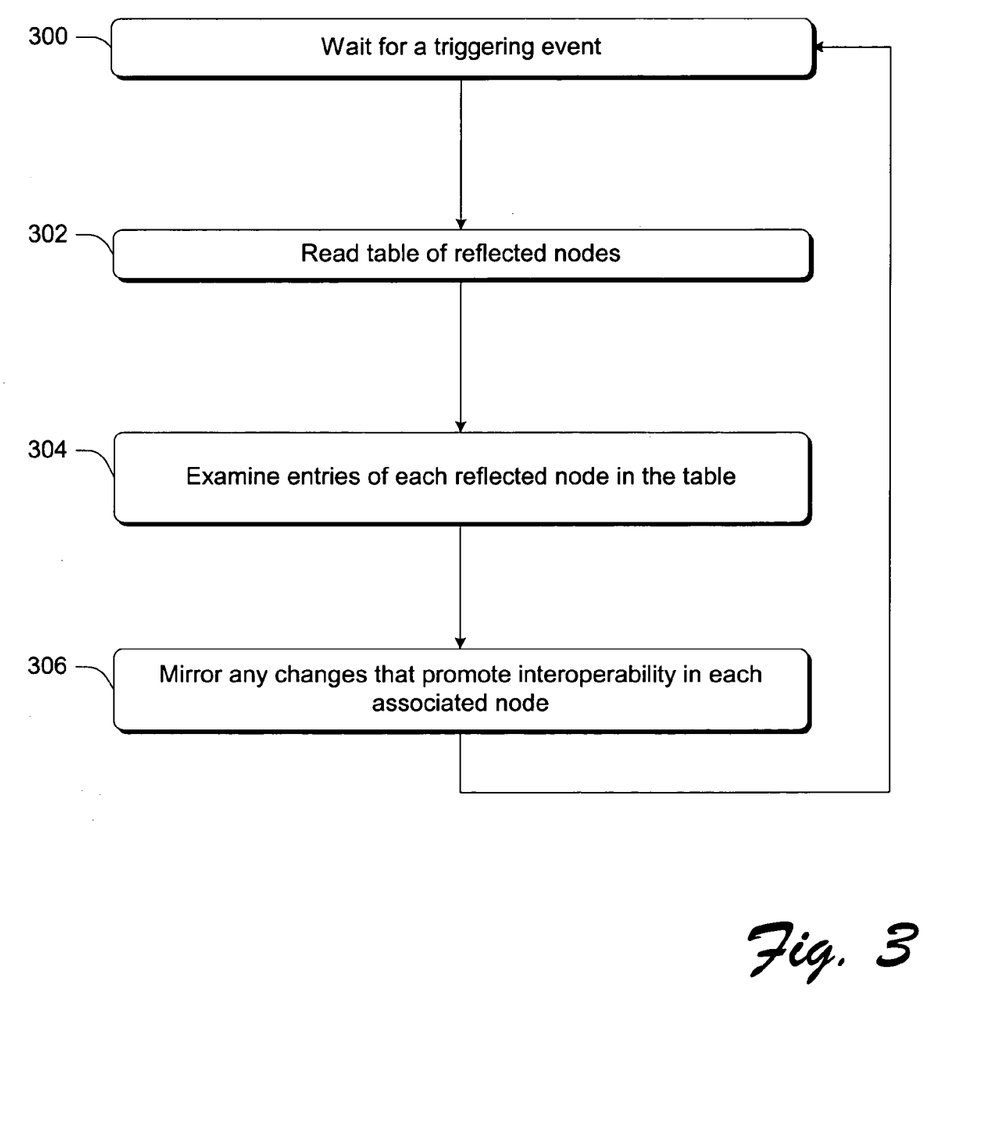
FIG. 3 is a flowchart illustrating the methodology of an implementation of an entry reflector portion of an access redirector and entry reflector.

FIG. 3 shows a methodological implementation of the exemplary reflector. At 300, the exemplary reflector waits for a triggering event. One example of such an event is a notification from the OS that a change has been made to the registry. Another example may be a passage of a given amount of time.

At 302, the exemplary reflector_reads a look-up table of reflected nodes. At 304, it examines entries of each reflected node in the table. It determines if any changes were made to any of the nodes (on both the default and the mirror sides).

At 306, the exemplary reflector determines whether mirroring such changes will promote interoperability. If so, then it mirrors the changes in one node to its associated node. In other words, the changes in the reflected node are stored in the original node and changes in the original node are stored in the reflected node.

Example using exemplary reflector methodological implementation of FIG. 3. The explanation of this example refers to FIGS. 1 and 3. The registry is a common configuration data structure for a 64-bit OS and applications running thereunder.

At 300 of FIG. 3, the OS notifies the exemplary reflector that there has been a change to the registry. For this example, the change will be to node 172 of FIG. 1 in accordance to the above description of the example using exemplary redirector methodological implementation of FIG. 2.

At 302 of FIG. 3, the exemplary reflector_reads a look-up table of reflected nodes. At 304, it examines entries of each reflected node in the table. During this examination, it discovers the node 172 of FIG. 1 has been altered.

At 306 of FIG. 3, the exemplary reflector determines whether mirroring such changes will promote interoperability. For this example, assume that it does promote interoperability. So, the exemplary reflector_mirrors the changes in node 172 to its associated node 162.

Redirector and Reflector

In the exemplary redirector/reflector, the above-described exemplary redirector and exemplary reflector are implemented concurrently. The combination promotes compatibility and interoperability.

Redirector/Reflector Implementation Example

The following is an example illustrating how the exemplary redirector/reflector promotes interoperability by redirecting/reflecting as appropriate:

32-bit application writes a new key under
\\Registry\\Machine\\Software\\Classes\\Clsid
{0285b5c0-12c7-11ce-bd31-00aa004bbb1f}\\
LocalServer32 REG_SZ "c:\Office\winword.exe";

the registry redirector intercepts this attempt to create the key and redirects to \\Registry\\Machine\\Software\\ Wow6432Node\\Classes\\Clsid\\{0285b5c0-12c7-11ce-bd31-0aa004bbb1f}\\LocalServer32; REG_SZ "c:\Office\winword.exe";

the reflector then sees the key created, and sees that \\Registry\\Machine\\Software\\Wow6432Node\\Classes is in the list of keys that may potentially be reflected;

the reflector examines the newly created key, and sees that it is a LocalServer32 key. The reflector contains hard-coded knowledge that LocalServer32 keys should be reflected, as they indicate that the GUID (unique program identifier) corresponds to an EXE file. It knows that 32-bit and 64-bit OLE/COM applications can interop with opposite-architecture OLE/COM EXEs, so the key should be reflected;

the reflector then copies the contents of \\Registry\\ Machine\\Software\\Wow6432Node\\Classes\\Clsid\\ {02 85b5c0-12c7-11ce-bd31-00aa004bbb1f}\\Local-Server32 to \\Registry\\Machine\\Software\\\\Classes\\ Clsid\\{0285b5c0-12c7-11ce-bd31-00aa004bbb1f}\\ LocalServer32

The following is a counter-example illustrating when data is not reflected using the exemplary reflector:

imagine a 32-bit app creating a new key under \\Registry\\ Machine\\Software\\Classes\\Clsid that looks like: {0285b5c0-12c7-11ce-bd31-00aa004bbb1f}\\Inproc-Server32 REG_SZ "c:\Office\spwordbrk.dll"

This one will be redirected to \\Registry\\Macine\\ Software\\Wow6432Node\\Classes\\Clsid just like the above example, but the redirector will look at "Inproc-Server32" and know that the OLE/COM interface is implemented in a DLL. A 32-bit DLL cannot be loaded into a 64-bit process due to the limitations of the WOW64 emulator, so the reflector will not reflect this key over to the 64-bit registry view.

Implementation Details of an Exemplary Embodiment

Figure 4:
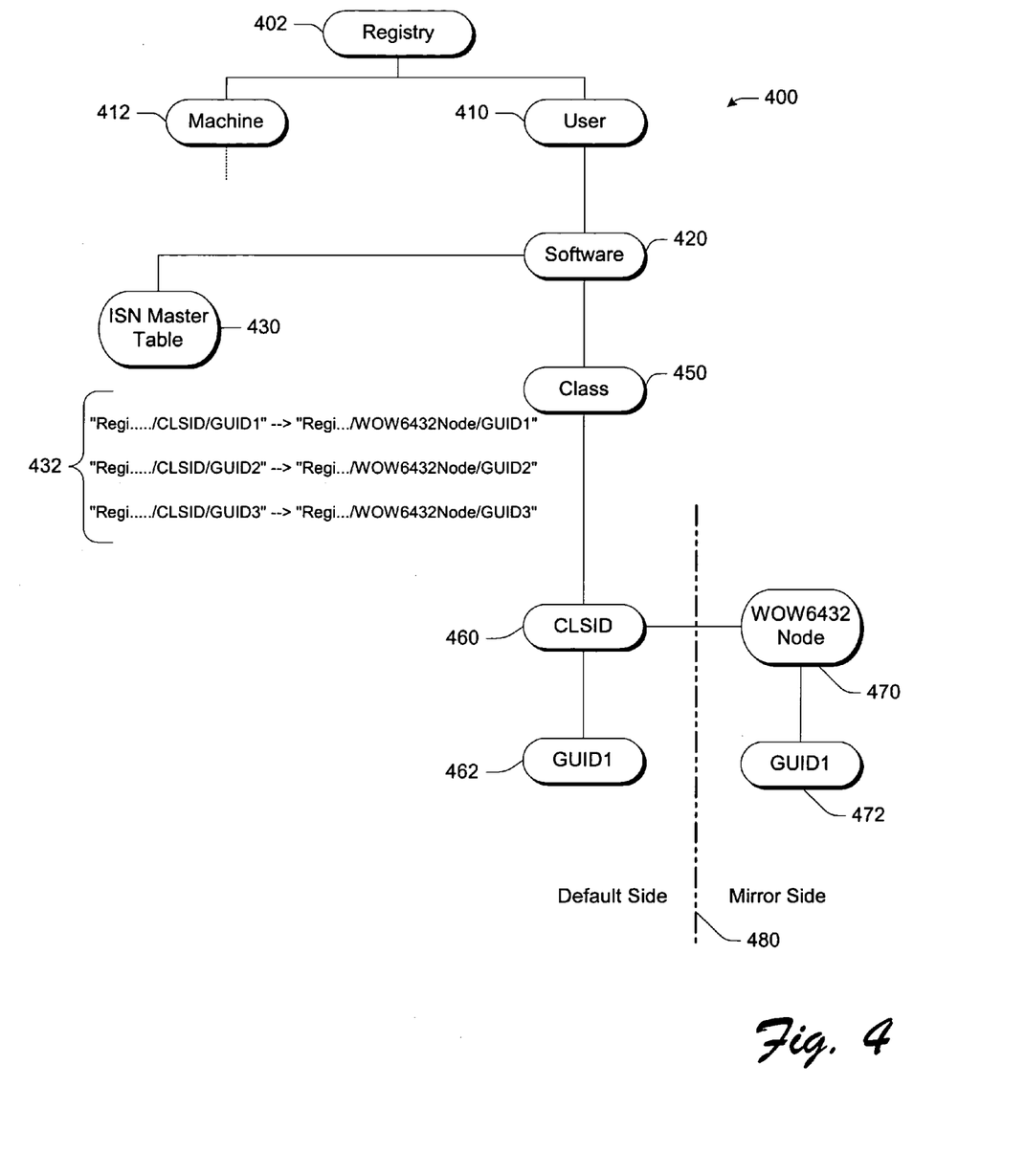
FIG. 4 illustrates a portion of a hierarchical structure of a typical "registry", which is an example of a common configuration data structure. The registry may be a subject of an implementation of an access redirector and entry reflector

For this example, assume that an exemplary 64-bit OS is designed to support two versions of applications, 32-bit and 64-bit. To maintain configuration information ("config-info"), this OS maintains a common configuration data structure, called the registry. FIG. 4 shows an example of a portion of such a registry. Both the 32-bit and 64-bit apps share config-info stored in the registry without affecting each other.

For example, a 64-bit app might create a key in the registry for its own purpose (like "ClassID") and a 32-bit app might not be familiar with that new key, but it should not delete it. Some applications might need to load different components using some well-known GUID information. (A GUID is a unique code that identifies an interface to an object across all computers and networks.)

FIG. 4 illustrates a portion of the hierarchical structure of the exemplary registry at 400. The top of the registry is root 402 called "registry." Below that are several subtrees. The head of two of such subtrees are shown in FIG. 4: "Machine" 412 and "User" 410. None of the nodes of Machine is shown in FIG. 4. However, some of the nodes of User are shown in this illustration.

"Software" 420 and "Class" 450 are examples of successively deeper nodes in the User 410. Under Software 420 is "ISN Master Table" node 430. ISN is Image Specific Node. As used here, "image" refers to a representation of a collection of data stored in a section of memory. More specifically, the term "image specific" refers to a representation of a specific application in memory. Under node 430 is the master ISN table 432.

Under Class 450 are multiple ISN nodes, such as CLasS IDentifier (CLSID) 460 shown in FIG. 4. Under CLSID 460 are one or more ISN identifier nodes, such as "GUID1" 462. CLSID 460 and its child 462 are on the "default side" of line 480. On the other side of the line are "Wow6432Node" 470 and "GUID1" 472. This other side is called the "mirror" side.

The exemplary redirector is responsible for policing registry-access calls initiated by a 32-bit or 64-bit application. The apps will use the same registry, but the exemplary redirector re-interprets registry information as appropriate for the application. To promote interoperability, it helps 32-bit applications to share some config-info with the 64-bit applications.

Image Specific Node (ISN): There might be some ISN in the tree that will be visible only to a particular type of image. For example, some key might be visible only to a 64-bit image, whereas some key might be visible only to a 32-bit image. The location of a 64-bit component stored in the registry might not be relevant to 32-bit applications whereas a 32-bit version of the same component might be relevant to a 32-bit application.

Registry Organization:

1. A master table (such as 432 of FIG. 4) in the registry defining ISN in the registry. ISN node will specify that all the children beyond ISN node will be specific to a particular type of image (i.e., either 32-bit or 64-bit).

2. The exemplary redirector splits the tree at ISN node (such as node 460) putting "Wow6432Node" node 470 as a child.

3. Any call from 32-bit applications beyond ISN node (such as node 460) will be redirected to some child under Wow6432Node 470.

4. Redirection of calls from 64-bit or 32-bit applications are transparent. For example, 32-bit applications will access the registry using the same key name it used in the true 32-bit world.

5. Redirector will use "Wow6432Node" 470 as a point of redirection.

6. A setup program will copy a necessary key from the 64-bit tree to the 32-bit tree so that 32-bit applications can work properly.

7. The exemplary reflector (as a background thread) runs occasionally to copy back and forth information that needs to be shared on the both sides of the mirror line 480.

Master ISN Table

A master ISN table (such as 432) might have the following two entries for example:

1. \\REGISTRY\\USER\\*\\Software\\Classes\\CLSID
2. \\REGISTRY\\MACHINE\\SOFTWARE\\Microsoft\\Shared Tools In this example, the CLSID 460 has one key GUID1 462. The setup program creates another key "Wow6432Node" 470 under CLSID for the redirection and copy GUID1 472 under Wow6432Node for use by 32-bit applications.

Scenarios:

1. 32-bit applications try to open some CLSID (such as GUID1 462) under \\REGISTRY\\USER\\*\\Software\\Classes\\CLSID. Applications can open that key in multiple calls or a single call using RegOpenKey. Eventually, they will end up opening the key under \\REGISTRY\\USER\\*\\Software\\Classes\\CLSID\Wow6432Node 470. Client can use the handle as if they have opened the right key because the redirection is completely transparent to the applications.

2. 64-bit applications try to open some CLSID (such as GUID1 462) under \\REGISTRY\\USER\\*\\Software\\Classes\\CLSID. The call will not be redirected and the 64-bit application will get a handle to the right key.

3. 32-bit applications pass a handle to 64-bit applications. If the handle has already been redirected, then any call by the 64-bit application will go to the child under the redirected sub-tree.

4. 64-bit applications pass a handle to 32-bit applications. By default, 64-bit applications cannot get a redirected handle. 32-bit applications will not redirect the path up to the key pointed by the handle. In other words, in the above example if 64-bit applications pass a handle to GUID1 to 32-bit applications, then any open call by 32-bit applications using that handle will not be redirected. But if the 64-bit applications pass the handle to \\REGISTRY\\USER\\*\\Software\\Classes\\CLSID, then any subsequent call by 32-bit applications will be redirected.

Exemplary Alternative Implementations

While the above examples are described in terms of a default side and a mirrored side, an alternative implementation may have no default side. An alternative exemplary redirector/reflector may simply make a determination each time and no side is favored.

Moreover, there may be more than two "sides". The registry may have multiple reflected nodes. Each node represents a specific image (such as an application).

Although the above examples are described in terms of versions where the differences is based upon the fundamental design of the OS, a version of a program module may differ from another when each stores config-info in a common location.

While the above examples are described in terms of applications, the exemplary redirector/reflector may be any program module or sub-module. That includes, but is not limited to, OSs, applications, APIs, DLLs, program objects, and procedures.

Although the above examples are described in terms of a 32-bit OS and a 64-bit OS, the exemplary redirector/reflector may be implemented on any generation of OS. That includes, but is not limited to, 32-bit OS, 64-bit OS, 128-bit OS, and 256-bit OS.

The above examples discuss differing OSs, but the exemplary redirector/reflector may be implemented with applications designed for the same version of OS, but may use different elements (such as DLLs, APIs, data files and formats, etc.).

Exemplary Computing Environment

Figure 5:
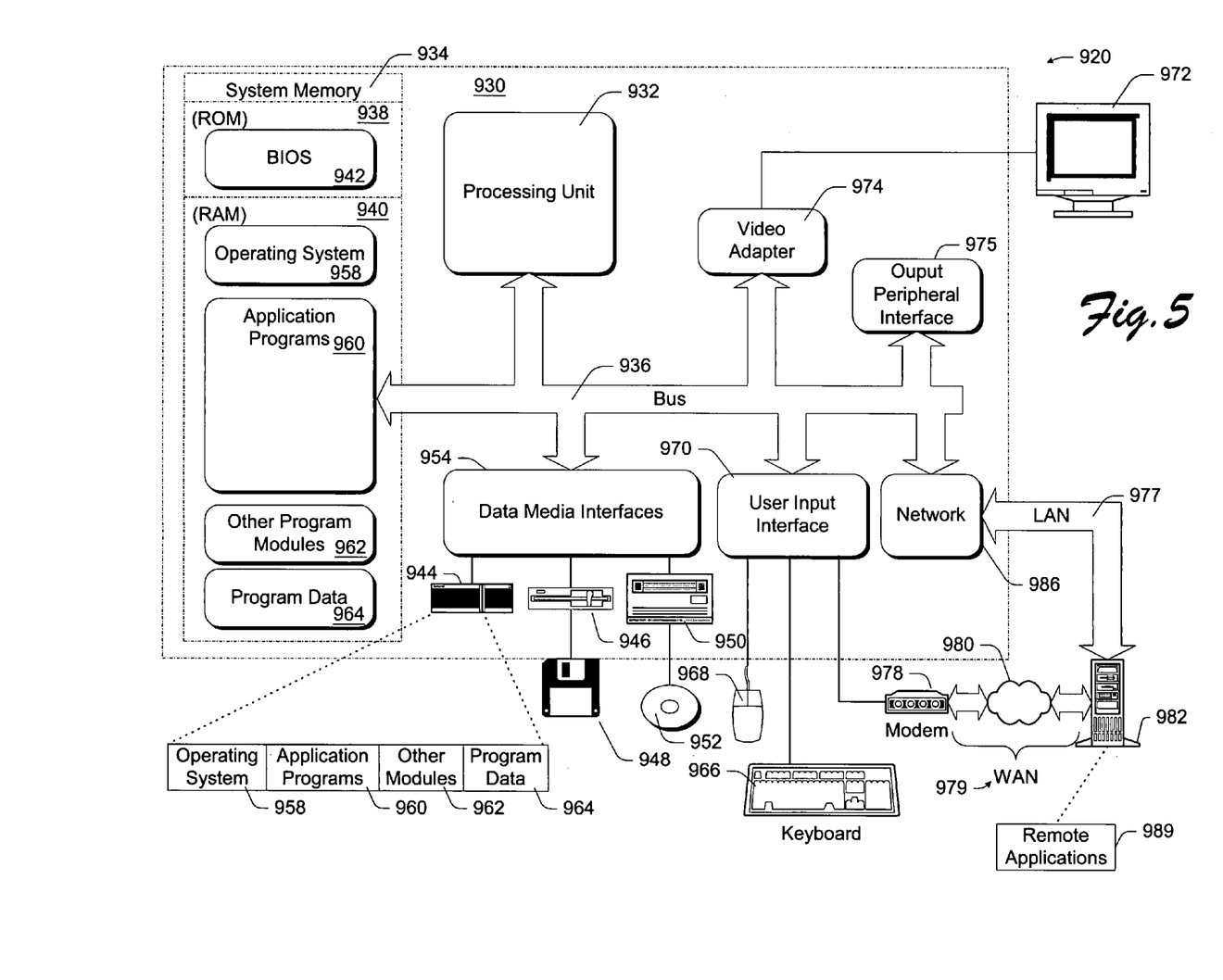
FIG. 5 is an example of a computing operating environment capable of implementing an access redirector and entry reflector.

FIG. 5 illustrates an example of a suitable computing environment 920 on which the exemplary redirector/reflector may be implemented.

Exemplary computing environment 920 is only one example of a suitable computing environment and is not intended to suggest any limitation as to the scope of use or functionality of the exemplary redirector/reflector. Neither should the computing environment 920 be interpreted as having any dependency or requirement relating to any one or combination of components illustrated in the exemplary computing environment 920.

The exemplary redirector/reflector is operational with numerous other general purpose or special purpose computing system environments or configurations. Examples of well known computing systems, environments, and/or configurations that may be suitable for use with the exemplary redirector/reflector include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary redirector/reflector may be described in the general context of computer-executable instructions, such as program modules, being executed by a computer. Generally, program modules include routines, programs, objects, components, data structures, etc. that perform particular tasks or implement particular abstract data types. The exemplary redirector/reflector may also be practiced in distributed computing environments where tasks are performed by remote processing devices that are linked through a communications network. In a distributed computing environment, program modules may be located in both local and remote computer storage media including memory storage devices.

As shown in FIG. 5, the computing environment 920 includes a general-purpose computing device in the form of a computer 930. The components of computer 920 may include, by are not limited to, one or more processors or processing units 932, a system memory 934, and a bus 936 that couples various system components including the system memory 934 to the processor 932.

Bus 936 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 930 typically includes a variety of computer readable media. Such media may be any available media that is accessible by computer 930, and it includes both volatile and non-volatile media, removable and non-removable media.

In FIG. 5, the system memory includes computer readable media in the form of volatile memory, such as random access memory (RAM) 940, and/or non-volatile memory, such as read only memory (ROM) 938. A basic input/output system (BIOS) 942, containing the basic routines that help to transfer information between elements within computer 930, such as during start-up, is stored in ROM 938. RAM 940 typically contains data and/or program modules that are immediately accessible to and/or presently be operated on by processor 932.

Computer 930 may further include other removable/non-removable, volatile/non-volatile computer storage media. By way of example only, FIG. 5 illustrates a hard disk drive 944 for reading from and writing to a non-removable, non-volatile magnetic media (not shown and typically called a "hard drive"), a magnetic disk drive 946 for reading from and writing to a removable, non-volatile magnetic disk 948 (e.g., a "floppy disk"), and an optical disk drive 950 for reading from or writing to a removable, non-volatile optical disk 952 such as a CD-ROM, DVD-ROM or other optical media. The hard disk drive 944, magnetic disk drive 946, and optical disk drive 950 are each connected to bus 936 by one or more interfaces 954.

The drives and their associated computer-readable media provide nonvolatile storage of computer readable instructions, data structures, program modules, and other data for computer 930. Although the exemplary environment described herein employs a hard disk, a removable magnetic disk 948 and a removable optical disk 952, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 948, optical disk 952, ROM 938, or RAM 940, including, by way of example, and not limitation, an operating system 958, one or more application programs 960, other program modules 962, and program data 964. Each of such operating system 958, one or more application programs 960, other program modules 962, and program data 964 (or some combination thereof) may include an embodiment of the exemplary redirector/reflector. More specifically, each may include an embodiment of an access-redirector, an entry-reflector, a receiver, a searcher, a loci-access redirector, a common configuration data structure, director, and replicator.

A user may enter commands and information into computer 930 through input devices such as keyboard 966 and pointing device 968 (such as a "mouse"). Other input devices (not shown) may include a microphone, joystick, game pad, satellite dish, serial port, scanner, or the like. These and other input devices are connected to the processing unit 932 through a user input interface 970 that is coupled to bus 936, but may be connected by other interface and bus structures, such as a parallel port, game port, or a universal serial bus (USB).

A monitor 972 or other type of display device is also connected to bus 936 via an interface, such as a video adapter 974. In addition to the monitor, personal computers typically include other peripheral output devices (not shown), such as speakers and printers, which may be connected through output peripheral interface 975.

Computer 930 may operate in a networked environment using logical connections to one or more remote computers, such as a remote computer 982. Remote computer 982 may include many or all of the elements and features described herein relative to computer 930.

Logical connections shown in FIG. 5 are a local area network (LAN) 977 and a general wide area network (WAN) 979. Such networking environments are commonplace in offices, enterprise-wide computer networks, intranets, and the Internet.

When used in a LAN networking environment, the computer 930 is connected to LAN 977 via network interface or adapter 986. When used in a WAN networking environment, the computer typically includes a modem 978 or other means for establishing communications over the WAN 979. The modem 978, which may be internal or external, may be connected to the system bus 936 via the user input interface 970, or other appropriate mechanism.

Depicted in FIG. 5, is a specific implementation of a WAN via the Internet. Computer 930 typically includes a modem 978 or other means for establishing communications over the Internet 980. Modem 978, which may be internal or external, is connected to bus 936 via interface 970.

In a networked environment, program modules depicted relative to the personal computer 930, or portions thereof, may be stored in a remote memory storage device. By way of example, and not limitation, FIG. 5 illustrates remote application programs 989 as residing on a memory device of remote computer 982. It will be appreciated that the network connections shown and described are exemplary and other means of establishing a communications link between the computers may be used.

Exemplary Operating Environment

FIG. 5 illustrates an example of a suitable operating environment 920 in which the exemplary redirector/reflector may be implemented. Specifically, the exemplary redirector/reflector is implemented by any program 960–962 or operating system 958 in FIG. 5.

The operating environment is only an example of a suitable operating environment and is not intended to suggest any limitation as to the scope or use of functionality of the exemplary redirector/reflector described herein. Other well known computing systems, environments, and/or configurations that may be suitable for use with the exemplary redirector/reflector include, but are not limited to, personal computers (PCs), server computers, hand-held or laptop devices, multiprocessor systems, microprocessor-based systems, programmable consumer electronics, wireless phones and equipments, general- and special-purpose appliances, network PCs, minicomputers, mainframe computers, distributed computing environments that include any of the above systems or devices, and the like.

Computer-Executable Instructions

An implementation of the exemplary redirector/reflector may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Computer Readable Media

An implementation of the exemplary redirector/reflector may be stored on or transmitted across some form of computer readable media. Computer readable media can be any available media that can be accessed by a computer. By way of example, and not limitation, computer readable media may comprise computer storage media and communications media.

Computer storage media include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Communication media typically embodies computer readable instructions, data structures, program modules, or other data in a modulated data signal such as carrier wave or other transport mechanism and included any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

Although the access redirector and entry reflector has been described in language specific to structural features and/or methodological steps, it is to be understood that an access redirector and entry reflector defined in the appended claims is not necessarily limited to the specific features or steps described. Rather, the specific features and steps are disclosed as preferred forms of implementing the claimed invention.

What is claimed is:

1. A method for controlling access to storage loci in a common configuration data structure, the method comprising:
   receiving an attempt to access a first storage locus in the common configuration data structure from a program module;
   determining whether to direct such attempt to at least a second locus in the common configuration data structure with the program module unaware that it is accessing the second locus.

2. A method as recited in claim 1 further comprising directing such attempt to at least the second locus, the program module being unaware that it is accessing the second locus.

3. A method as recited in claim 1 further comprising determining whether to direct such attempt to at least a third locus in the common configuration data structure with the program module is unaware that it is accessing the third locus.

4. A method as recited in claim 1 further comprising examining a loci-redirection table, wherein the determining is based, at least in part, upon information in the table.

5. A method as recited in claim 1, wherein the program module is an application.

6. A method as recited in claim 1, wherein:
   the first storage locus is reserved for configuration information ("config-info") for a first version of a program module;
   the second storage locus is reserved for config-info for a second version of the program module.

7. A method as recited in claim 1, wherein the common configuration data structure is a registry.

8. A computer-readable medium having computer-executable instructions that, when executed by a computer, performs the method as recited in claim 1.

9. A method for controlling access to storage loci in a common configuration data structure, the method comprising:
- receiving an attempt to access a first storage locus in the common configuration data structure from a program module;
- directing such attempt to at least a second locus in the common configuration data structure, the program module being unaware that it is accessing the second locus.

10. A method as recited in claim 9 further comprising directing such attempt to at least a third locus in the common configuration data structure, the program module being unaware that it is accessing the third locus.

11. A computer-readable medium having computer-executable instructions that, when executed by a computer, performs the method as recited in claim 9.

12. A method for directing an access to a storage locus in a common configuration data structure, the method comprising:
- intercepting an attempt by a program module to access configuration information ("config-info") of the program module at a first storage locus in the common configuration data structure;
- determining whether to redirect such attempt to at least a second locus in the common configuration data structure with the program module unaware that it is accessing its config-info at the second locus.

13. A method as recited in claim 12, further comprising redirecting such attempt to at least the second locus, the program module being unaware that it is accessing its config-info at the second locus.

14. A method as recited in claim 12, further comprising examining a loci-redirection table, wherein the determining is based, at least in part, upon information in the table.

15. A method as recited in claim 12, wherein the program module is an application.

16. A method as recited in claim 12, wherein:
- the first storage locus is reserved for configuration information ("config-info") for a first version of a program module;
- the second storage locus is reserved for config-info for a second version of the program module.

17. A method as recited in claim 12, wherein the common configuration data structure is a registry.

18. A computer-readable medium having computer-executable instructions that, when executed by a computer, performs the method as recited in claim 12.

19. A method for directing an access to a storage locus in a common configuration data structure, the method comprising:
- intercepting an attempt by a program module to access configuration information ("config-info") of the program module at a first storage locus in the common configuration data structure;
- redirecting such attempt to at least a second locus in the common configuration data structure, the program module being unaware that it is accessing its config-info at the second locus.

20. A method as recited in claim 19 further comprising redirecting such attempt to at least a third locus in the common configuration data structure, the program module being unaware that it is accessing the third locus.

21. A method for replicating data in storage loci of a common configuration data structure of multiple storage loci, the method comprising:

searching multiple storage loci of the common configuration data structure for modified data;
finding modified data in a first storage locus;
copying selected modified data from the first storage locus to at least a second storage locus.

22. A method as recited in claim 21 further comprising copying selected modified data from the first storage locus to at least a third storage locus.

23. A method as recited in claim 21, wherein only storage loci listed in a loci-redirection table are searched during the searching.

24. A method comprising:
- obtaining a triggering event that signals that a method as recited in claim 21 be initiated;
- initiating such method as recited in claim 21.

25. A method as recited in claim 24 further comprising sending a triggering event when data in the common configuration data structure is altered.

26. A method as recited in claim 21, wherein:
- the first storage locus is reserved for configuration information ("config-info") for a first version of a program module;
- the second storage locus is reserved for config-info for a second version of the program module.

27. A method as recited in claim 21, wherein the common configuration data structure is a registry.

28. A computer-readable medium having computer-executable instructions that, when executed by a computer, performs the method as recited in claim 21.

29. A method of access redirection and entry reflection, the method comprising:
- controlling access to storage loci in a common configuration data structure of multiple storage loci, the controlling comprising:
  - receiving an attempt to access a first storage locus in the common configuration data structure from a program module;
  - directing such attempt to at least a second locus in the common configuration data structure, the program module being unaware that it is accessing the second locus;
- replicating modified data in storage loci, the replicating comprising:
  - searching multiple storage loci for modified data;
  - finding modified data in at least one storage locus;
  - copying selected modified data from the storage locus to at least another storage locus.

30. A computer-readable medium having computer-executable instructions that, when executed by a computer, perform a method for replicating data in storage loci of a common configuration data structure of multiple storage loci, the method comprising:
- searching multiple storage loci of the common configuration data structure for modified data;
- finding modified data in a first storage locus;
- copying selected data from the first storage locus to at least a second storage locus.

31. An apparatus comprising:
a processor;
an access-redirector executable on the processor to:
- receive an attempt to access a first storage locus in a common configuration data structure from a program module;
- redirect such attempt to at least a second locus in the common configuration data structure, the program module being unaware that it is accessing the second locus.

32. An apparatus comprising:
a processor;
a entry-reflector executable on the processor to:
   search multiple storage loci of a common configuration data structure for modified data;
   find modified data in a first storage locus;
   copy selected data from the first storage locus to at least a second storage locus.

33. An operating system comprising:
a common configuration data structure containing storage loci for storing configuration information ("config-info");
a loci-access redirector comprising:
   receiver for receiving an attempt to access a first storage locus in the common configuration data structure from a program module;
   director for directing such attempt to at least a second locus in the common configuration data structure, the program module being unaware that it is accessing the second locus.

34. An operating system as recited in claim 33, wherein the program module is an application.

35. An operating system as recited in claim 33, wherein:
the first storage locus is reserved for config-info for a first version of a program module;
the second storage locus is reserved for config-info for a second version of the program module.

36. An operating system as recited in claim 33, wherein the common configuration data structure is a registry.

37. An operating system comprising:
a common configuration data structure containing storage loci for storing configuration information ("config-info");
a loci-entry reflector comprising:
   searcher for searching multiple storage loci of the common configuration data structure for modified data and for finding modified data in a first storage locus;
   replicator for copying selected data from the first storage locus to at least a second storage locus.

38. An operating system as recited in claim 37, wherein:
the first storage locus is reserved for config-info for a first version of a program module;
the second storage locus is reserved for config-info for a second version of the program module.

39. A computer-readable medium having a common configuration data structure data structure, comprising:
a first storage locus containing configuration information ("config-info") for a first version of a program module;
a second storage locus containing config-info for a second version of the program module.

40. A computer-readable medium as recited in claim 39 further comprising a third storage locus containing a table that relates the first storage locus to the second storage locus.

* * * * *